March 22, 1938.  P. v. DOEPP  2,111,889
WIND BRAKE FOR AIRCRAFT
Original Filed June 29, 1934
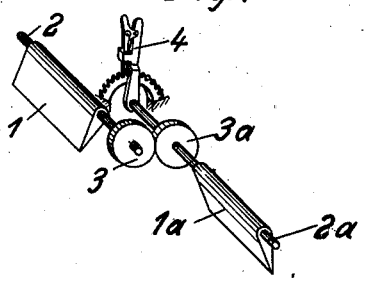
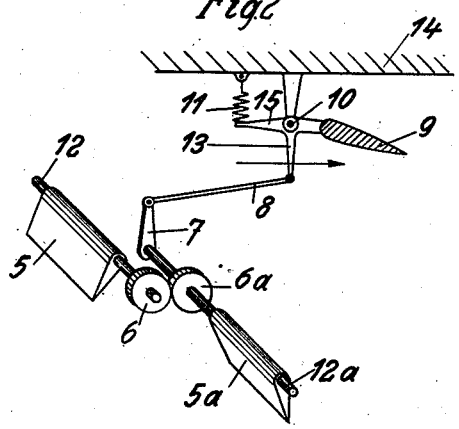
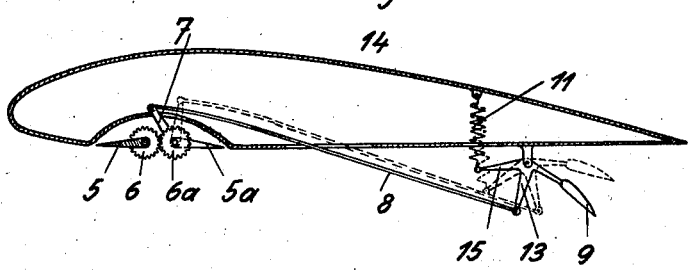
Inventor.
Philipp v. Doepp
by Karl Michaelis, Atty Patented Mar. 22, 1938

2,111,889

UNITED STATES PATENT OFFICE 2,111,889

WIND BRAKE FOR AIRCRAFT

Philipp v. Doepp, Dessau, Germany, assignor to Junkers Flugzeug-und-Motorenwerke Aktiengesellschaft, Dessau, Germany Original application June 29, 1934, Serial No. 733,136. Divided and this application September 21, 1936, Serial No. 101,816. In Germany July 3, 1933

5 Claims. (Cl. 244—113)

This application is a division of my pending application for patent of the United States Serial No. 733,136 for "Brakes for aircraft", filed June 29, 1934.

It relates to a modification of the wind brake described and claimed in the main application and it is an object of the present invention to provide means whereby the wind brake can be adjusted more readily and with the expenditure of less force.

Wind brakes have been provided in connection with aircraft and more especially flying machines, these brakes having the form of ledges serving to break up the air current formed above and/or below the surface of the wing. More particularly such ledges have been provided for breaking up the air current at the underside of the wing and provision has been made for bringing such ledges into operative position by rocking them about their axle.

Wind brakes of the kind above mentioned involve the drawback that the ledges must be rocked into operative and inoperative position in a direction opposed to the direction of flow of the wind, whereby a considerable expenditure of power is required to effect this movement.

The present invention now relates to a wind brake consisting of ledges secured to the wing for rocking motion, which requires only little power for adjustment. To this end I provide a pair of coacting ledges, each ledge being adjustable in a direction opposite to that of the other ledge, and I couple the ledges of the pair in such manner, that the air forces acting on them partly or altogether compensate each other. A wind brake of this kind can be adjusted into and out of operative position either manually or automatically under the action of static pressure. I arrange these ledges about flush with the underside of the wing and near the front edge thereof and spaced from this edge not more than forty per cent of the chord length of the wing, one ledge extending on each side of the plane of symmetry and transversely to the direction of flight across a considerable part of the span of the wing. The ledges are hingedly connected to the wing. The axes about which they can be rocked, are so located relative to their edges, that in their inoperative position the free edge of one ledge is disposed in front, the free edge of the other ledge to the rear of its axis of rotation. I provide means for simultaneously rocking both ledges about their axes in opposite senses.

In a preferred embodiment of my invention I so arrange the ledges that in their operative position their free edges are spaced from the underside of the wing not more than six per cent of the chord length of the wing.

A wind actuated controlling surface may be operatively connected with one of the ledges, and the wind pressure acting on this controlling surface will act towards adjusting the ledges into a position where they are capable of breaking up the air current in contact with the wing.

In the drawing affixed to this specification and forming part thereof, two forms of a wind brake embodying my invention are illustrated diagrammatically by way of example.

In the drawing,

Fig. 1 is a perspective view of a pair of ledges with means for adjusting same manually, while Fig. 2 is a similar view of a wind brake with means for automatic adjustment of same.

Fig. 3 is a diagrammatic showing of the arrangement of the brake of Fig. 2 in an airplane.

Referring to the drawing and first to Fig. 1, 1 and 1a are the two ledges serving to break up the air current on the underside of the wing and 2, 2a are the axles on which the ledges are fixed for rocking movement. The axles 2, 2a are arranged in staggered relation and toothed wheels 3, 3a gearing with each other are mounted thereon. 4 is a hand lever fixed to the axle 2a.

Obviously if the axle 2a is turned by aid of lever 4, the ledge 1a will be adjusted in one, the ledge 1 in the opposite direction and the air forces acting on the two ledges will then partly compensate each other. In the modification shown in Figs. 2 and 3 the two ledges 5, 5a are mounted on axles 12, 12a, which are coupled by means of gear wheels 6, 6a. A lever 7 fixed to the axle 12a is connected by means of a rod 8 to the arm 13 of a surface 9 mounted on the wing 14 for rocking motion about a pivot 10, an extension 15 being acted upon by a spring 11, which tends to counteract the static pressure acting on the surface 9.

If the pressure acting on this surface is low, in other words, if the craft is travelling at low speed, the two ledges 5, 5a are held in their inoperative position by the action of spring 11. With increasing speed and wind pressure acting on the surface 9, this surface will be adjusted to approach a horizontal position, whereby the two ledges 5, 5a are adjusted into a position, where they are capable of breaking up the air current in contact with the wing. This adjustment of the ledges requires little expenditure of power, since the wind pressure acting on one ledge substantially balances the wind pressure acting on the other ledge.

I wish it to be understood that I do not desire to be limited to the exact details of construction shown and described for obvious modifications will occur to a person skilled in the art.

I claim:—

1. In an aircraft in combination, a wing or supporting plane, a pair of ledges arranged at the underside of said wing and extending substantially transversely to the direction of flight and spaced from the front edge of said wing by a distance not exceeding forty per cent of the chord length of said wing, one ledge being arranged on either side of the plane of symmetry of the craft, the axes of rotation of said ledges being so arranged that in the inoperative position, in which the ledges lie about flush with the underside of the wing, the free edge of one ledge is disposed in front, the free edge of the other ledge to the rear of its axis of rotation, and means for coupling said ledges for simultaneous rocking movement in relatively opposite sense.

2. The combination of claim 1, in which the free edges of the ledges are spaced, in the operative position of the ledges, from the underside of said wing not more than six per cent of the chord length of said wing.

3. The combination of claim 1, in which means, adjustable by the wind pressure, are associated with one of said ledges for automatically rocking same into and out of operative position.

4. The combination of claim 1, in which a toothed wheel coupling is provided to couple said ledges for simultaneous rocking movement in opposite senses.

5. The combination of claim 1, in which means are provided for coupling said ledges for simultaneous rocking movement in opposite sense and a wind actuated controlling surface operatively connected with one of said ledges.

PHILIPP v. DOEPP.